(12) United States Patent
Patel et al.

(10) Patent No.: US 9,710,952 B2
(45) Date of Patent: Jul. 18, 2017

(54) SYSTEMS AND METHODS FOR PROVIDING PIXELATION AND DEPIXELATION ANIMATIONS FOR MEDIA CONTENT

(71) Applicant: Facebook, Inc., Menlo Park, CA (US)

(72) Inventors: Nilesh Vinubhai Patel, Mountain View, CA (US); William M. Ruben, San Francisco, CA (US); William Joseph Flynn, III, San Francisco, CA (US); Daniel James Smith, II, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 116 days.

(21) Appl. No.: 14/531,473

(22) Filed: Nov. 3, 2014

(65) Prior Publication Data

US 2016/0125244 A1    May 5, 2016

(51) Int. Cl.
*G06T 13/80*    (2011.01)
*H04N 5/262*    (2006.01)

(52) U.S. Cl.
CPC ........... *G06T 13/80* (2013.01); *H04N 5/2621* (2013.01)

(58) Field of Classification Search
CPC ............ A63F 13/12; G09G 2340/0407; G09G 2340/045; H04N 9/3188; H04N 21/4782; H04N 21/6125; H04N 21/4318; H04N 21/47205; H04N 21/812; H04N 5/23219; H04N 1/00307; H04N 5/23293; H04N 5/23245; H04N 5/23229; H04N 21/44008; H04N 21/8549; H04N 5/2628; G06T 2207/10016; G06T 3/40; G06T 5/003; G06T 2207/20016; G06T 2207/30201; G06T 2207/30232; G06T 3/4007; G06T 13/80; G06T 13/00; G06T 2219/2016; G06T 2207/20201; G06T 3/4053; G06T 11/00; G06F 3/04845; G06F 17/30781; G06F 17/30017; G06F 17/3089;
(Continued)

(56) References Cited

U.S. PATENT DOCUMENTS

2005/0053310 A1* 3/2005 Myochin ................. G06T 11/60
                                                            382/284
2006/0018562 A1* 1/2006 Ruggiero .............. G06F 9/3879
                                                            382/300

(Continued)

OTHER PUBLICATIONS

Image Magick v6 Examples—Digital Photo Handling, Created: Jul. 21, 2006, Updated: Jun. 16, 2011, downloaded from http://www.imagemagick.org/Usage/photos/#anonymity on Apr. 22, 2016.*

(Continued)

*Primary Examiner* — Haixia Du
(74) *Attorney, Agent, or Firm* — Sheppard Mullin Richter & Hampton LLP

(57) ABSTRACT

Systems, methods, and non-transitory computer-readable media can detect a trigger to initiate at least one of a pixelation animation or a depixelation animation for a media content item. A set of pixelated images can be generated based on a source image associated with the media content item. Variable durations for presenting the set of pixelated images can be determined. The set of pixelated images can be presented, based on the variable durations, to produce the at least one of the pixelation animation or the depixelation animation.

20 Claims, 12 Drawing Sheets

(58) Field of Classification Search
CPC ..... G06F 2203/04806; G06F 17/30056; G06F 3/0481; G02B 7/282; G02B 13/009
See application file for complete search history.

(56) References Cited

U.S. PATENT DOCUMENTS

| | | | | |
|---|---|---|---|---|
| 2007/0262996 | A1* | 11/2007 | Fernandez | G06T 13/00 345/473 |
| 2008/0181533 | A1* | 7/2008 | Jung | G06K 9/3241 382/283 |
| 2009/0202170 | A1* | 8/2009 | Weiss | G06T 5/005 382/275 |
| 2013/0034158 | A1* | 2/2013 | Kirchhoffer | H04N 19/159 375/240.12 |
| 2014/0282013 | A1* | 9/2014 | Amijee | G06F 3/0482 715/732 |

OTHER PUBLICATIONS

Pixelated Box Effect, How to do it?, May 18, 2008, downloaded from https://forums.adobe.com/thread/384114 on Apr. 22, 2016.*
Pokey, Animated Blurred Text, posted on May 27, 20017, downloaded from http://www.gamexe.net/photoshop/animatedblurredtext/ on Dec. 8, 2016.*

* cited by examiner

SYSTEMS AND METHODS FOR PROVIDING PIXELATION AND DEPIXELATION ANIMATIONS FOR MEDIA CONTENT

FIELD OF THE INVENTION

The present technology relates to the field of media content processing. More particularly, the present technology relates to techniques for providing pixelation and depixelation animations for media content.

BACKGROUND

Today, people utilize computing devices (or systems) for various purposes. Users of computing devices can interact with one another, access content, share content, and create content. Users can use their computing devices, for example, to send messages to one another, browse web sites, access online resources, interact with social networks, and create media content, such as by taking pictures and recording videos.

In some instances, a user can access a camera on his or her computing device. In one example, the user can launch a camera application (i.e., app) on the computing device. Under conventional approaches, when the user switches between a front-facing camera mode and a rear-facing camera mode in the camera application, a display of the computing device will often fade or change into a live camera view in a substantially straightforward manner. In another example, when the user creates media content to be transmitted, the transmission of the media content generally appears to occur in a straightforward manner under conventional approaches. In a further example, in accordance with conventional approaches, when the user causes media content to be provided in a thumbnail preview, the thumbnail preview is provided in an overall straightforward manner. However, such conventional approaches can often times be uninteresting, monotonous, and lackluster. These and other concerns associated with conventional approaches can create challenges for or reduce the overall user experience associated with processing or interacting with media content.

SUMMARY

Various embodiments of the present disclosure can include systems, methods, and non-transitory computer readable media configured to detect a trigger to initiate at least one of a pixelation animation or a depixelation animation for a media content item. A set of pixelated images can be generated based on a source image associated with the media content item. Variable durations for presenting the set of pixelated images can be determined. The set of pixelated images can be presented, based on the variable durations, to produce the at least one of the pixelation animation or the depixelation animation.

In an embodiment, the source image can have a source image resolution size. The generating of the set of pixelated images can further comprise scaling the source image at a first scale factor to produce, at least temporarily, a first image with a first reduced image resolution size that is less than the source image resolution size. The first image can be enlarged to produce a first pixelated image having the source image resolution size. The first pixelated image can be included in the set of pixelated images. The source image can be scaled at a second scale factor to produce, at least temporarily, a second image with a second reduced image resolution size less than the source image resolution size. The second image can be enlarged to produce a second pixelated image having the source image resolution size. The second pixelated image can be included in the set of pixelated images.

In an embodiment, it can be determined, based on the trigger, to initiate the pixelation animation. In some instances, the first reduced image resolution size can be greater than the second reduced image resolution. The presenting of the set of pixelated images can include presenting the first pixelated image prior to presenting the second pixelated image.

In an embodiment, it can be determined, based on the trigger, to initiate the depixelation animation. In some cases, the first reduced image resolution size can be less than the second reduced image resolution. The presenting of the set of pixelated images can include presenting the first pixelated image prior to presenting the second pixelated image.

In an embodiment, the scaling of the source image can utilize a nearest neighbor algorithm.

In an embodiment, the trigger can be associated with at least one of an instruction to switch between a rear-facing camera view and a front-facing camera view, an instruction to use the media content item in a first communication to be transmitted, or a receipt of a second communication including the media content item.

In an embodiment, the at least one of the pixelation animation or the depixelation animation can be performed during a loading of a camera view. In some cases, the at least one of the pixelation animation or the depixelation animation can be completed within a time frame associated with the loading of the camera view.

In an embodiment, the media content item can correspond to a video. The source image can correspond to a video frame within in the video.

In an embodiment, the video frame can be selected based on one or more user instructions.

In an embodiment, the video frame can correspond to a first video frame of the video.

In an embodiment, the media content item can correspond to an image. The source image can correspond to the image.

In an embodiment, systems, methods, and non-transitory computer readable media of the disclosed technology can be configured to perform at least one of progressively shrinking the set of pixelated images when being presented or progressively enlarging the set of pixelated images when being presented.

In an embodiment, the at least one of the pixelation animation or the depixelation animation can exclude one or more smoothing effects.

In an embodiment, the determining of the variable durations can be based on an accelerated interpolation process.

In an embodiment, the variable durations can include at least a first duration and a second duration. The set of pixelated images can include at least a first pixelated image and a second pixelated image. The first pixelated image can have a greater image pixel size than the second pixelated image. In some instances, the accelerated interpolation process can cause the first pixelated image to be presented at the first duration and the second pixelated image to be presented at the second duration. The first duration can be longer in time than the second duration.

In an embodiment, the depixelation animation can occur within an allowable time deviation from when the media content item is completely loaded.

Many other features and embodiments of the invention will be apparent from the accompanying drawings and from the following detailed description.

Figure 1:
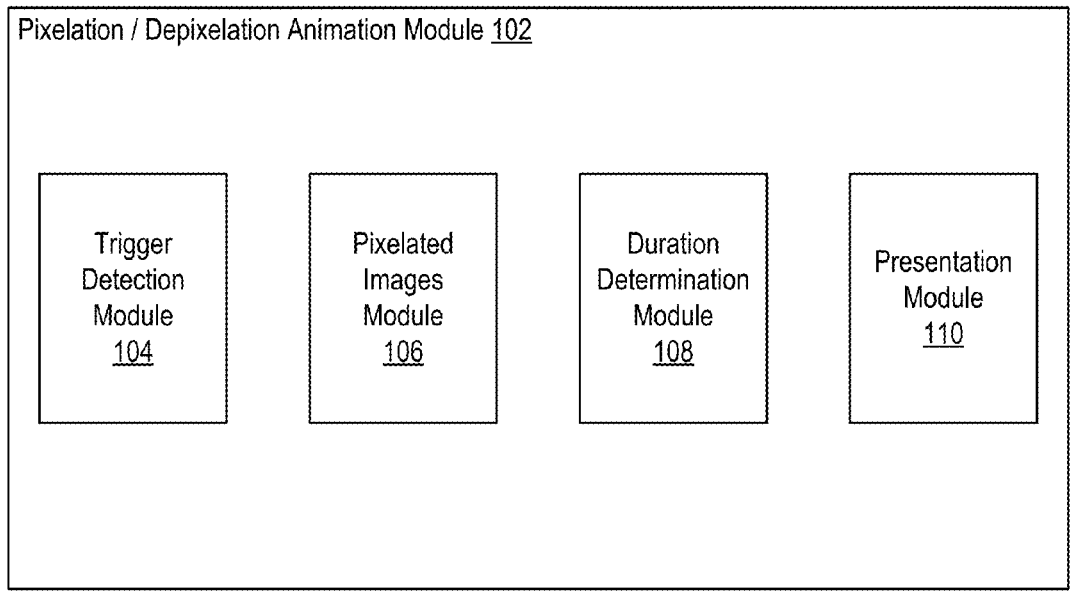
FIG. 1 illustrates an example pixelation/depixelation animation module configured to facilitate providing pixelation and depixelation animations for media content, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Pixelation and Depixelation Animations for Media Content

People use computing devices (or systems) for a wide variety of purposes. Computing devices can provide different kinds of functionality. Users can utilize their computing devices to produce information, access information, and share information. In some cases, users can use their computing devices to produce information in the form of media content. For example, users can use one or more cameras on their computing devices to create media content items, such as by taking pictures and recording videos.

In some instances, a camera of a computing device (or system) can be utilized by various applications or software running on the computing device. In one example, an operating system of the computing device can provide a default camera application (i.e., app) that utilizes the camera to take pictures and record videos. In another example, social networking applications, social media applications, and communications applications can utilize the camera to capture pictures and videos to be stored, shared, or transmitted. In a further example, media editing applications, such as image enhancing applications, can also utilize the camera to generate media content items.

However, under conventional approaches, utilizing computing device cameras and providing media content items can often times be uninteresting, boring, or lacking in entertainment value. In one example, conventional approaches to loading a live camera view, such as when switching between front-facing and rear-facing camera views, can be straightforward and boring. In another example, transmitting or sharing media content items in accordance with conventional approaches can appear to be monotonous and unentertaining. In a further example, conventional approaches to previewing media content items, such as via thumbnails, can also be straightforward and uninteresting.

Therefore, an improved approach to utilizing cameras and processing media content can be beneficial for addressing or alleviating various concerns associated with conventional approaches. Various embodiments of the present disclosure can detect a trigger to initiate at least one of a pixelation animation or a depixelation animation for a media content item. In general, the pixelation animation can correspond to an animation in which displayed visuals or graphics become progressively more pixelated or obscured. The depixelation animation can correspond to an animation in which displayed visuals or graphics become progressively less pixelated or become more unobscured. In some embodiments, a set of pixelated images can be generated based on a source image associated with the media content item. Variable durations for presenting the set of pixelated images can be determined. The set of pixelated images can be presented, based on the variable durations, to produce the at least one of the pixelation animation or the depixelation animation. It is contemplated that many variations are possible.

FIG. 1 illustrates an example pixelation/depixelation animation module 102 configured to facilitate providing pixelation and depixelation animations for media content, according to an embodiment of the present disclosure. As shown in the example of FIG. 1, the pixelation/depixelation animation module can include a trigger detection module 104, a pixelated images module 106, a duration determination module 108, and a presentation module 110. The components shown in this figure and all figures herein are exemplary only, and other implementations may include additional, fewer, integrated, or different components. Some components may not be shown so as not to obscure relevant details.

In some embodiments, the example pixelation/depixelation animation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware components, and/or any combination thereof. In some cases, the example pixelation/depixelation animation module 102 can be implemented as software running on one or more computing devices or systems, such as a user or client computing device. In one example, the pixelation/depixelation animation module 102 can be implemented within an operating system of the user or client computing device. In another example, the pixelation/depixelation animation module 102 can be implemented as an application, a program, or an applet, etc., running on the user or client computing device. It should be understood that many variations are possible.

The trigger detection module 104 can be configured to facilitate detecting a trigger to initiate at least one of a pixelation animation or a depixelation animation for a media content item. Whether the pixelation animation or the depixelation animation is to be initiated for the media content item can depend on the trigger that is detected. Some triggers can cause the pixelation animation to be initiated. Some triggers can cause the depixelation animation to be initiated. Some triggers can cause both the pixelation animation and the depixelation animation to be initiated. More details regarding the trigger detection module will be provided with reference to FIG. 2.

The pixelated images module 106 can be configured to facilitate generating a set of pixelated images based on a source image associated with the media content item. The pixelated images can be generated to correspond to images of the source image having undergone varying degrees of pixelation. A more detailed discussion relating to the pixelated images module will be provided below with reference to FIG. 3.

The duration determination module 108 can be configured to facilitate determining variable durations for presenting the set of pixelated images. In some cases, a first pixelated image in the set of pixelated images can be presented for a first duration, while a second pixelated image in the set of pixelated images can be presented for a second duration, and a third pixelated image in the set of pixelated images can be presented for a third duration, and so forth. In one example, the first duration can be longer in time than the second duration, which can be longer in time than the third duration. In another example, the first duration can be shorter in time than the second duration, which can be shorter in time than the third duration. In a further example, the first, second, and third durations can be of an equivalent length of time. More details relating to the duration determination module will be provided below with reference to FIG. 4.

The presentation module 110 can be configured to facilitate presenting the set of pixelated images, based on the variable durations, to produce the at least one of the pixelation animation or the depixelation animation. In some embodiments, the presentation module 110 can cause each generated pixelated image in the set to be presented (e.g., rendered, displayed, etc.) at a respective variable duration, such that the presenting of all the pixelated images in the set results in the pixelation animation or the depixelation animation for the media content item.

In one example, the media content item can correspond to a video. The pixelation animation or the depixelation animation can be produced (and/or provided, presented, displayed, etc.) for the video. The pixelation animation or the depixelation animation can be provided as an enhancement, an extension, a prelude, an introduction, or a visual embellishment, etc., to the video. Again, the source image can be utilized in the generating of the set of pixelated images, and the pixelated images can be used for producing the animation(s). In this example, the source image can be selected as a video frame within in the video. In some cases, the video frame can be selected to correspond to a first video frame of the video. In some instances, the video frame can be selected based on one or more user instructions, such as an user command to select a current video frame during a playback of the video.

In another example, the media content item can correspond to an image. The pixelation animation or the depixelation animation can be produced for the image. The pixelation or depixelation animation can be provided or presented as an enhancement, an extension, a prelude, an introduction, or a visual embellishment, etc., to the image. In some cases, the source image can correspond to the image, which is the media content item in this example. As such, the set of pixelated images can be generated based on the image (e.g., the media content item). It is contemplated that there can be many variations or other possibilities.

Figure 2:
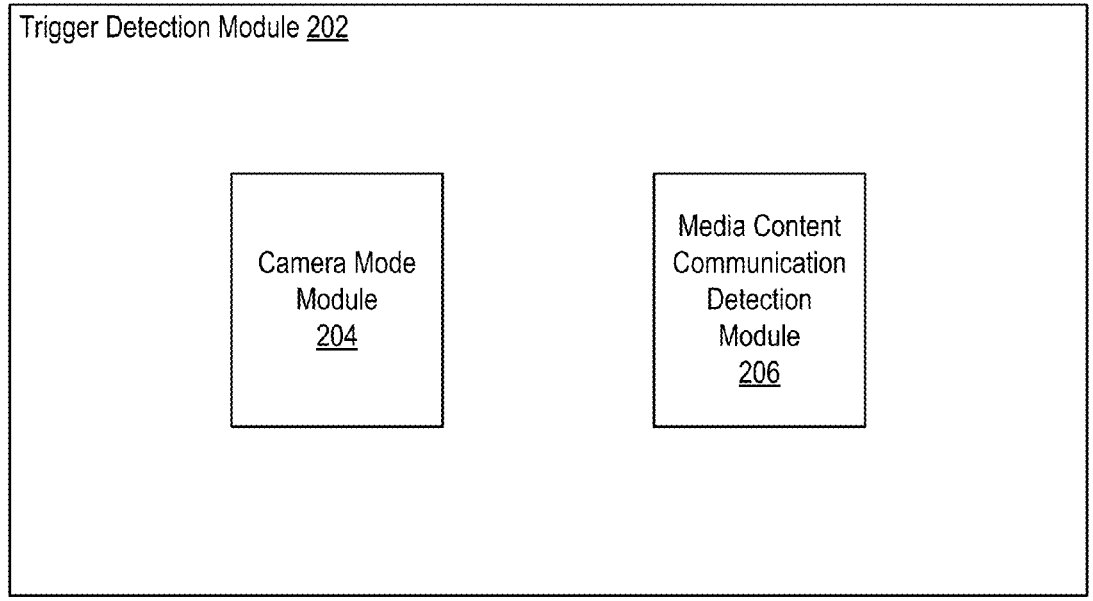
FIG. 2 illustrates an example trigger detection module configured to facilitate providing pixelation and depixelation animations for media content, according to an embodiment of the present disclosure.

FIG. 2 illustrates an example trigger detection module 202 configured to facilitate providing pixelation and depixelation animations for media content, according to an embodiment of the present disclosure. In some embodiments, the trigger detection module 104 can be implemented as the example trigger detection module 202. As discussed previously, the trigger detection module 202 can be configured to detect a trigger to initiate at least one of a pixelation animation or a depixelation animation for a media content item. In some instances, the pixelation animation can be set to initiate when the trigger is detected. In some cases, the depixelation animation can be set to initiate when the trigger is detected. In the example of FIG. 2, the trigger detection module 202 can include a camera mode module 204 and a media content communication detection module 206.

The camera mode module 204 can be configured to detect the loading of a camera view, such as a live or real-time camera view. In some cases, the camera view can be loaded when a camera application or feature is launched. In one example, when a computing device (or system) has a front-facing camera and a rear-facing camera, the camera view can be loaded and switched between a front-facing camera view and a rear-facing camera view, such as when a user of the computing device taps or interacts with a "Selfie" button or a flip camera button. In some implementations, the camera mode module 204 can detect a trigger in the form of an instruction, such as a user command, to switch between the rear-facing camera view and the front-facing camera view.

The media content communication detection module 206 can be configured to detect a trigger in the form of an instruction to use a media content item in a communication to be transmitted. In some implementations, the user of the computing device can create the media content item. The user can, in some cases, draw on the media content item, write text on the media content item, or otherwise edit the media content item. The user can elect to use the media content item in a communication to be transmitted, such as by attaching the media content item to the communication for transmission. In one example, the pixelation or depixelation animation is initiated when the media content item appears to get attached to the communication or prepares to be transmitted in the communication.

Moreover, the media content communication detection module 206 can be configured to detect a receipt of a communication including the media content item. In some implementations, the receiving of the communication including the media content item can correspond to a trigger for initiating the pixelation or depixelation animation. In one example, the media content item is attached to a communication that is received. In this example, the media content item can be "locked" and obscured (e.g., pixelated). When the media content item is "unlocked," the depixelation animation can be initiated to cause the media content to be unobscured and displayed in full resolution. It should be appreciated that many variations are possible.

Figure 3:
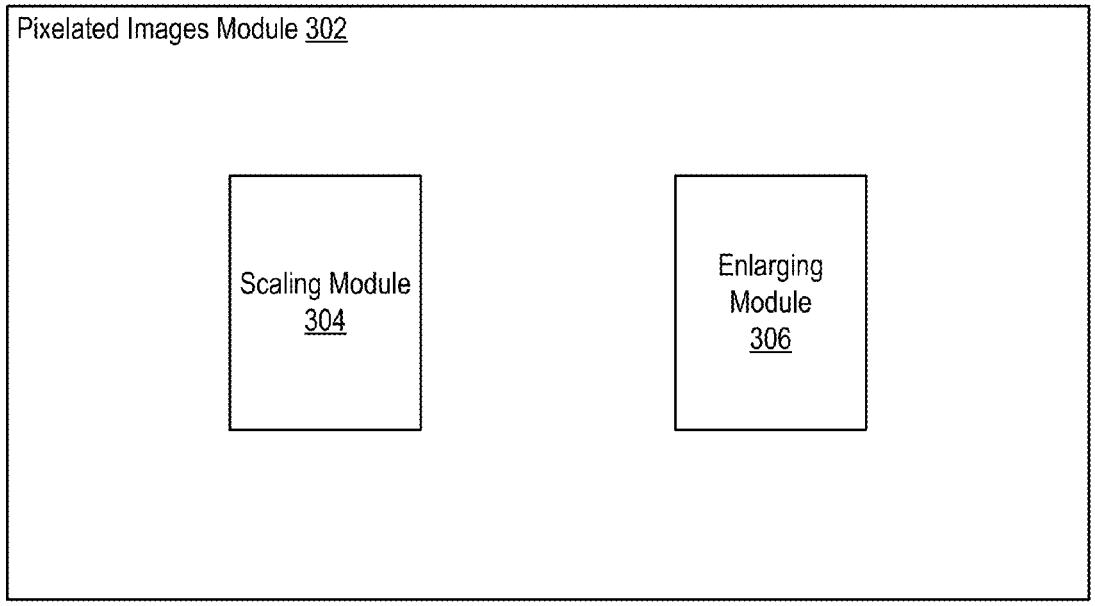
FIG. 3 illustrates an example pixelated images module configured to facilitate providing pixelation and depixelation animations for media content, according to an embodiment of the present disclosure.

FIG. 3 illustrates an example pixelated images module 302 configured to facilitate providing pixelation and depixelation animations for media content, according to an embodiment of the present disclosure. In some embodiments, the pixelated images module 106 can be implemented as the example pixelated images module 302. As discussed above, the pixelated images module 302 can be configured to facilitate generating a set of pixelated images based on a source image associated with the media content item. In the example of FIG. 3, the pixelated images module 302 can include a scaling module 304 and an enlarging module 306.

The source image associated with the media content item can have a source image resolution size. The pixelated images module 302 can be configured to facilitate generating the set of pixelated images. In some implementations, the scaling module 304 can facilitate the generating of the set of pixelated images by scaling the source image at a first scale factor to produce, at least temporarily, a first image with a first reduced image resolution size that is less than the source image resolution size. In some embodiments, the scaling of the source image can utilize a nearest neighbor algorithm.

Moreover, the enlarging module 306 can facilitate the generating of the set of pixelated images by enlarging the first image to produce a first pixelated image having the source image resolution size. The first pixelated image can be included in the set of pixelated images. Furthermore, the scaling module 304 can scale the source image at a second scale factor to produce, at least temporarily, a second image with a second reduced image resolution size less than the source image resolution size. The enlarging module 306 can enlarge the second image to produce a second pixelated image having the source image resolution size. The second pixelated image can also be included in the set of pixelated images. It should be understood that the scaling and enlarging techniques can be utilized numerous times to facilitate the generating of the set of pixelated images.

As discussed previously, the pixelation animation (e.g., instead of the depixelation animation) can be initiated based on the trigger. In some instances, for the pixelation animation, the first reduced image resolution size can be greater than the second reduced image resolution, and the providing or presenting of the set of pixelated images can include presenting the first pixelated image prior to presenting the second pixelated image.

Additionally, the depixelation animation (e.g., instead of the pixelation animation) can be initiated based on the trigger. In some cases, for the depixelation animation, the first reduced image resolution size can be less than the second reduced image resolution, and the presenting of the set of pixelated images can include presenting the first pixelated image prior to presenting the second pixelated image.

Figure 4:
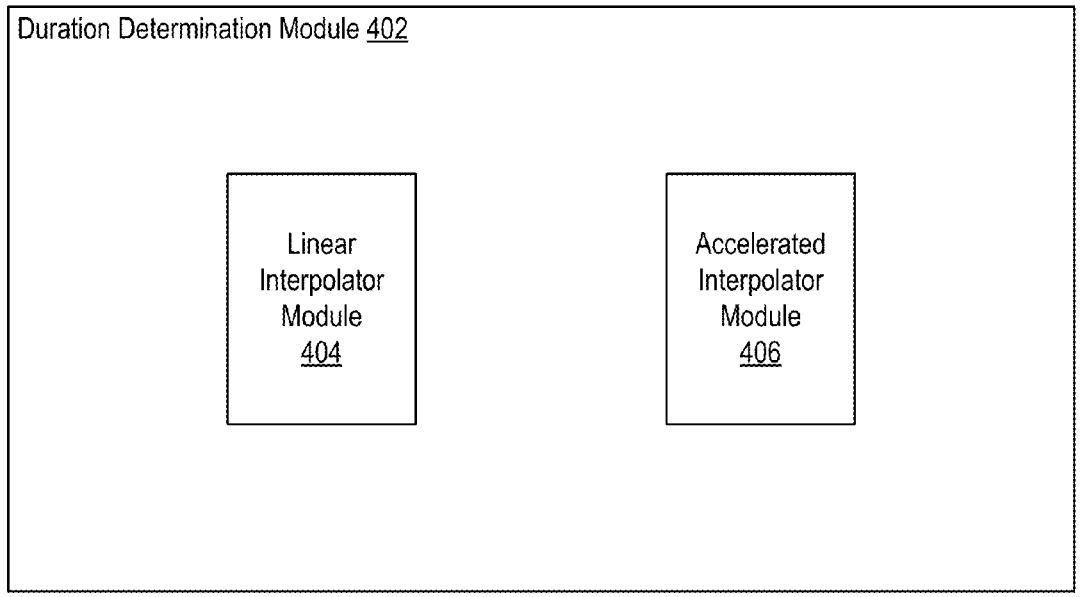
FIG. 4 illustrates an example duration determination module configured to facilitate providing pixelation and depixelation animations for media content, according to an embodiment of the present disclosure.

FIG. 4 illustrates an example duration determination module 402 configured to facilitate providing pixelation and depixelation animations for media content, according to an embodiment of the present disclosure. In some embodiments, the duration determination module 108 can be implemented as the example duration determination module 402. As discussed above, the duration determination module 402 can be configured to facilitate determining variable durations for presenting the set of pixelated images. In the example of FIG. 4, the duration determination module 402 can include a linear interpolator module 404 and an accelerated interpolator module 406.

In some implementations, the determining of the variable durations can be based on a linear interpolation process. Accordingly, the linear interpolator module 404 can cause each of the variable durations to be set or restricted to a constant value. For example, the linear interpolator module 404 can cause a first duration of a presentation of a first pixelated image in the set of pixelated images to be 0.2 seconds, and can cause a second duration of a presentation of a second pixelated image in the set to be 0.2 seconds as well. Moreover, the linear interpolator module 404 can cause a third duration of a presentation of a third pixelated image in the set of pixelated images to also be 0.2 seconds, and so forth. It follows that the animation can spend equal amounts of time (i.e., durations) presenting or displaying the varying levels of pixelation.

In some embodiments, the determining of the variable durations can be based on an accelerated interpolation process. As such, the accelerated interpolator module 406 can cause the variable durations to be set to different values. In one example, for a pixelation animation, the accelerated interpolator module 406 can cause the duration for presenting a last pixelated image in the set of pixelated images to be 0.4 seconds, and can cause the duration for presenting a second to last pixelated image in the set to be 0.2 seconds. Moreover, the accelerated interpolator module 406 can cause the duration for presenting a third to last pixelated image in the set to be 0.1 seconds, and so forth. In this example, the last pixelated image can have a greater image pixel size (e.g., bigger pixels throughout) than the second to last pixelated image, and the second to last pixelated image can have a greater image pixel size than the third to last pixelated image. Accordingly, the accelerated interpolator module 406 can cause the pixelation animation to spend more time or a longer duration presenting those pixelated images that appear more pixelated and/or more blocky (e.g., that have bigger pixels), and less time or a shorter duration presenting those pixelated images that appear less pixelated or more finely pixelated.

In another example, for a depixelation animation, the accelerated interpolator module 406 can cause the duration for presenting a first pixelated image in the set to be 0.4 seconds, the duration for presenting a second pixelated image in the set to be 0.2 seconds, and the duration for presenting a third pixelated image in the set to be 0.1 seconds, and so forth. In this example, the first pixelated image can have a greater image pixel size than the second pixelated image, and the second pixelated image can have a greater image pixel size than the third pixelated image. As such, the accelerated interpolator module 406 can cause the depixelation animation to also spend more time (e.g., longer durations) presenting those pixelated images that appear more pixelated and/or more blocky, and less time (e.g., shorter durations) presenting those pixelated images that appear less pixelated or more finely pixelated.

It is contemplated that many variations are possible. For example, in some cases, decelerated interpolation can be utilized for the pixelation and/or depixelation animations.

Figure 5A:
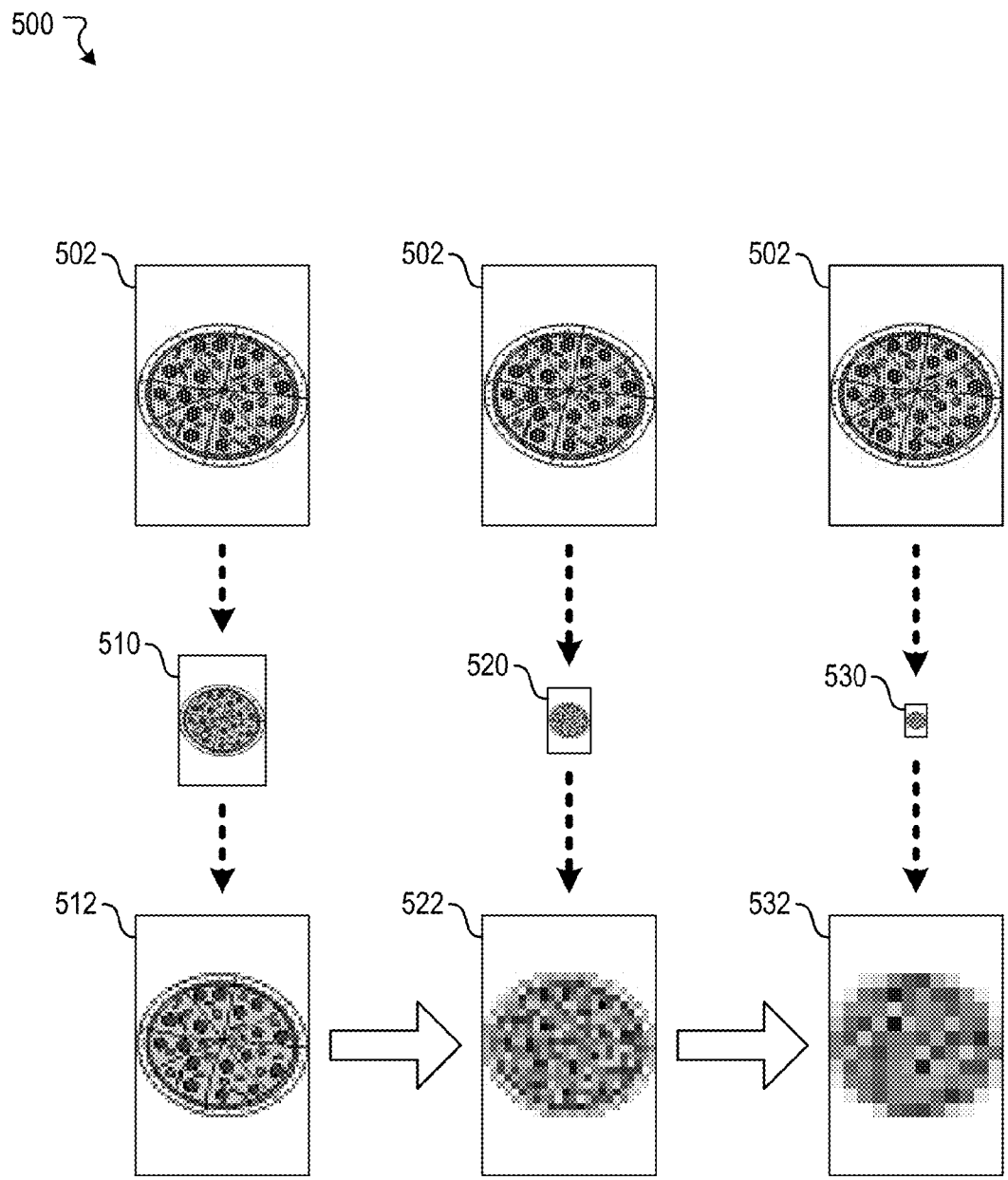
FIG. 5A illustrates an example scenario associated with providing pixelation and depixelation animations for media content, according to an embodiment of the present disclosure.

FIG. 5A illustrates an example scenario 500 associated with providing pixelation and depixelation animations for media content, according to an embodiment of the present disclosure. The scenario 500 illustrates one example approach for generating the set of pixelated images for producing a pixelation animation.

In the example scenario 500 of FIG. 5A, there can be a source image 502. The source image can have a source image resolution size. The example scenario 500 illustrates that the generating of the set of pixelated images can involve scaling the source image at a first scale factor (e.g., 50%, one half, etc.) to produce, at least temporarily, a first image 510 with a first reduced image resolution size that is less than the source image resolution size. The first image 510 can then be enlarged to produce a first pixelated image 512 having the source image resolution size. The first pixelated image 512 can be included in the set of pixelated images. The source image 502 can be scaled at a second scale factor (e.g., 25%, one fourth, etc.) to produce, at least temporarily, a second image 520 with a second reduced image resolution size less than the source image resolution size. The second image 520 can be enlarged to produce a second pixelated image 522 having the source image resolution size. The second pixelated image 522 can also be included in the set of pixelated images. In this example, the source image 502 can be scaled at a third scale factor (e.g., 12.5%, one eighth, etc.) to produce, at least temporarily, a third image 530 with a third reduced image resolution size less than the source image resolution size. The third image 530 can be enlarged to produce a third pixelated image 532 having the source image resolution size. The third pixelated image 532 can also be included in the set of pixelated images. In the example scenario 500, the first pixelated image 512 can be presented before the second pixelated image 522, which can be presented before the third pixelated image 532, in order to produce the pixelation animation. It is understood that more or fewer pixelated images can be generated and included in the set of pixelated images to produce pixelation or depixelation animations.

Figure 5B:
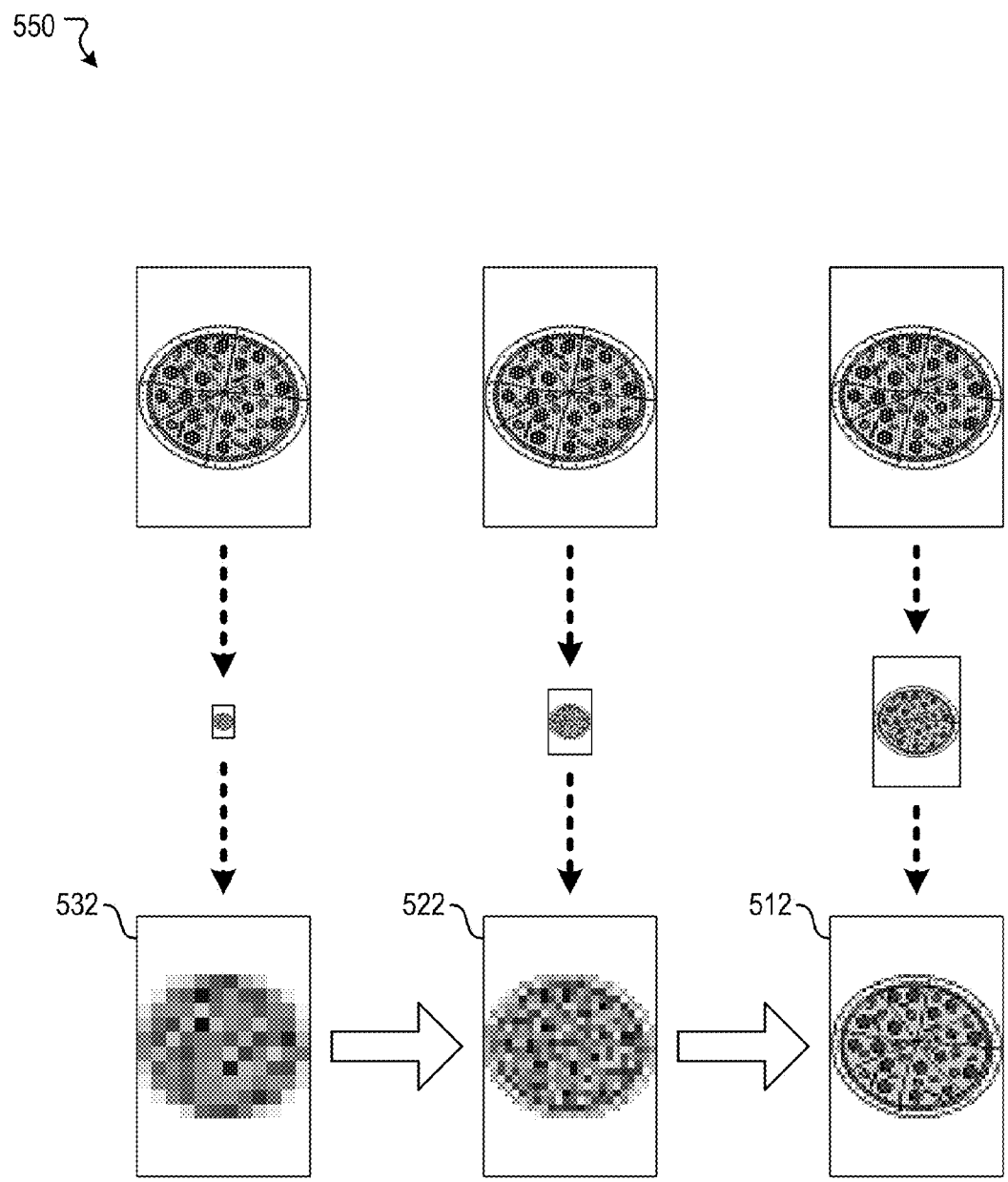
FIG. 5B illustrates an example scenario associated with providing pixelation and depixelation animations for media content, according to an embodiment of the present disclosure.

FIG. 5B illustrates an example scenario 550 associated with providing pixelation and depixelation animations for media content, according to an embodiment of the present disclosure. The scenario 550 illustrates one example approach for generating the set of pixelated images for producing a depixelation animation.

In the example scenario 550 of FIG. 5B, the first pixelated image 512, the second pixelated image 522, and the third pixelated image 532 can be generated as described above. In this example, the third pixelated image 532 can be presented before the second pixelated image 522, which can be presented before the first pixelated image 512, in order to produce the depixelation animation. Many variations are possible.

Figure 6A:
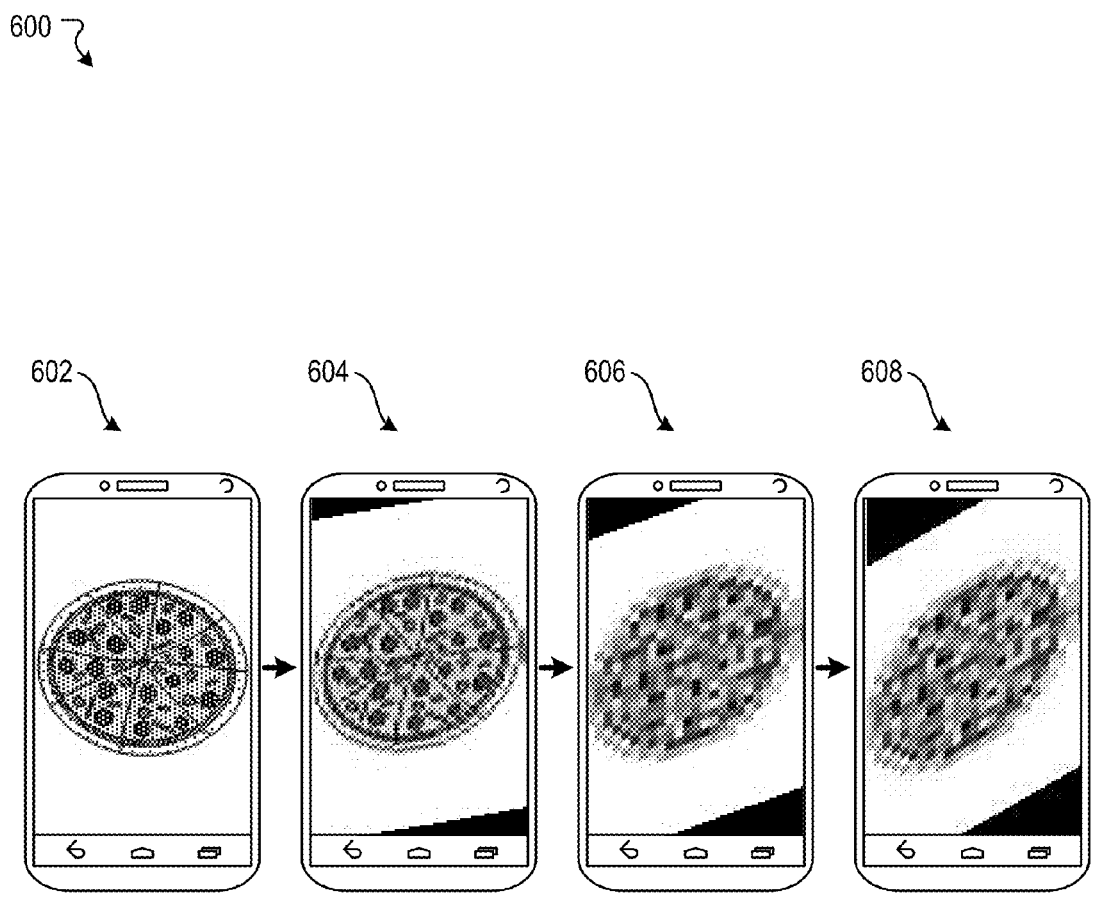
FIG. 6A illustrates an example scenario associated with providing pixelation and depixelation animations for media content, according to an embodiment of the present disclosure.

FIG. 6A illustrates an example scenario 600 associated with providing pixelation and depixelation animations for media content, according to an embodiment of the present disclosure. The example scenario 600 illustrates a pixelation animation being provided or presented when switching between a rear-facing camera view and a front-facing camera view. In this example, a user can have inputted an instruction (e.g., tapped on a "Selfie" button, activated a flip camera mode, etc.) to cause a switching or flipping between the rear-facing camera view and the front-facing camera view. As discussed above, this can trigger an initiation of the pixelation animation.

In this example, the user can cause the camera view to switch or flip. In the first stage 602, the displayed visuals or graphics can correspond to a last screenshot of the camera view when the user inputted the instruction to switch or flip the camera view. This last screenshot can be used as the source image for the pixelation animation. The second stage 604 illustrates a camera view flipping animation in conjunction with the pixelation animation. The third stage 606 illustrates the camera view flipping animation and the pixelation animation progressing further. The fourth stage 608 illustrates the camera view flipping animation and the pixelation animation progressing even further. It should be appreciated that, in some embodiments, a depixelation animation can be initiated additionally or alternatively.

In some implementations, the pixelation animation or the depixelation animation can be performed during a loading of a camera view. In some instances, the at least one of the pixelation animation or the depixelation animation can be completed within a time frame associated with the loading of the camera view. For example, pixelation or depixelation animation can be completed during the switching (e.g., flipping) of the camera view.

Figure 6B:
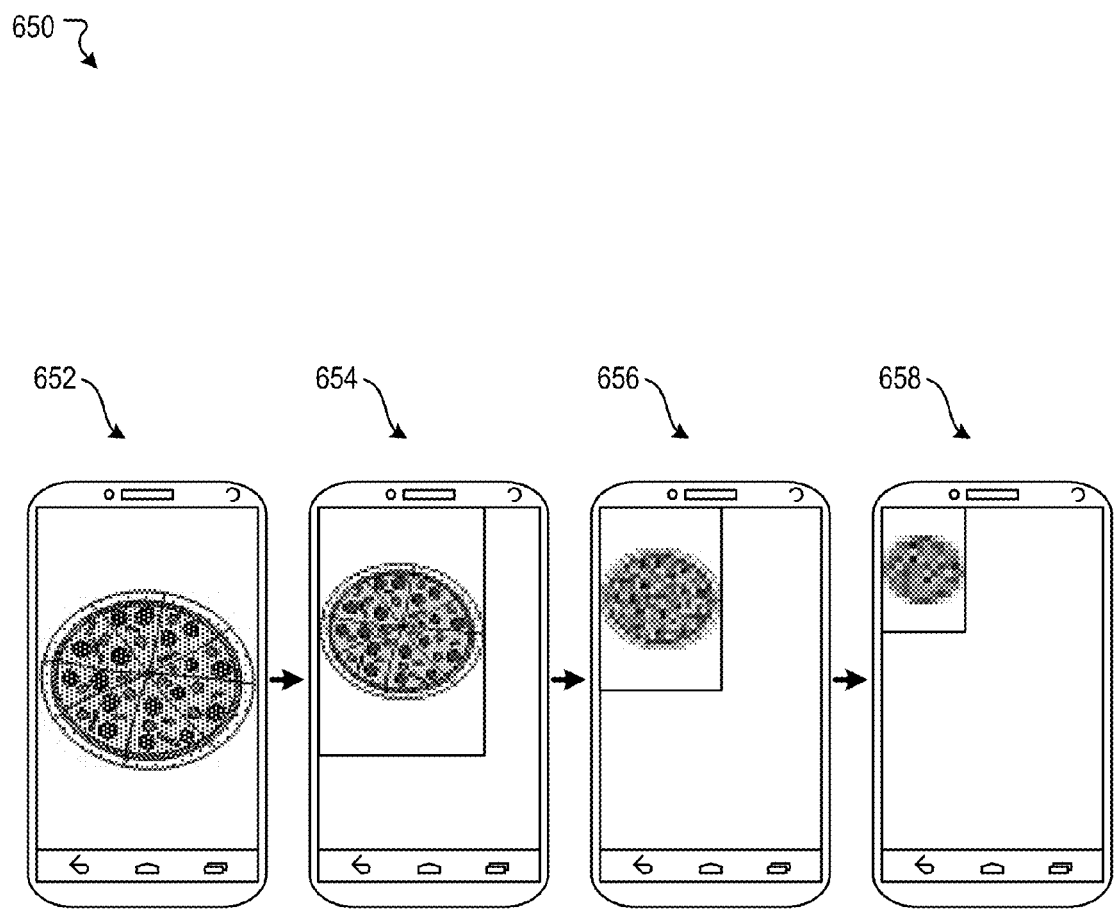
FIG. 6B illustrates an example scenario associated with providing pixelation and depixelation animations for media content, according to an embodiment of the present disclosure.

FIG. 6B illustrates an example scenario 650 associated with providing pixelation and depixelation animations for media content, according to an embodiment of the present disclosure. The example scenario 650 illustrates a progressively shrinking of the set of pixelated images when being presented. In this example, the shrinking animation and a pixelation animation can be provided, presented, and/or displayed in conjunction. The first stage 652 illustrates an beginning of the shrinking animation and the pixelation animation. The second stage 654 illustrates the shrinking animation and the pixelation animation progressing along. The third stage 656 illustrates the shrinking animation and the pixelation animation further progressing. The fourth stage 658 illustrates the shrinking and pixelation animations progressing even further. It is contemplated that a progressively enlarging of the set of pixelated images when being presented is also possible. It should also be appreciated that a depixelation animation can be utilized.

Figure 7:
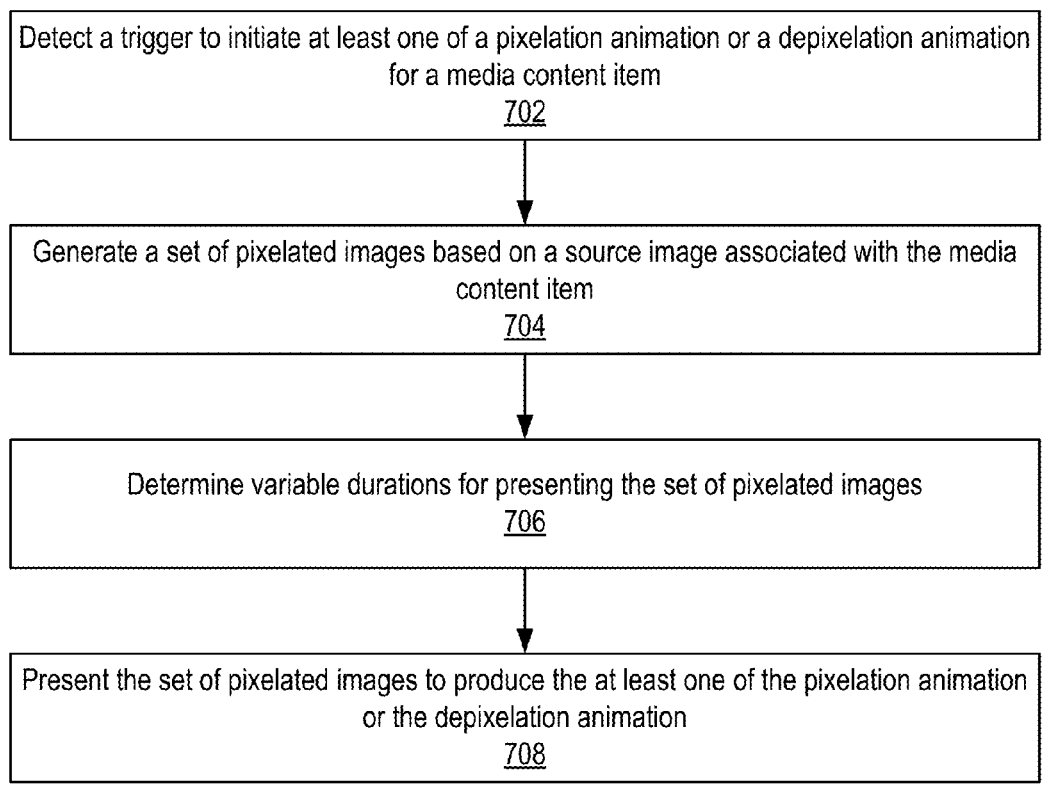
FIG. 7 illustrates an example method associated with providing pixelation and depixelation animations for media content, according to an embodiment of the present disclosure.

FIG. 7 illustrates an example method 700 associated with providing pixelation and depixelation animations for media content, according to an embodiment of the present disclosure. It should be appreciated that there can be additional, fewer, or alternative steps performed in similar or alternative orders, or in parallel, within the scope of the various embodiments unless otherwise stated.

At block 702, the example method 700 can detect a trigger to initiate at least one of a pixelation animation or a depixelation animation for a media content item. At block 704, the example method 700 can generate a set of pixelated images based on a source image associated with the media content item. At block 706, the example method 700 can determine variable durations for presenting the set of pixelated images. At block 708, the example method 700 can present the set of pixelated images, based on the variable durations, to produce the at least one of the pixelation animation or the depixelation animation.

Figure 8:
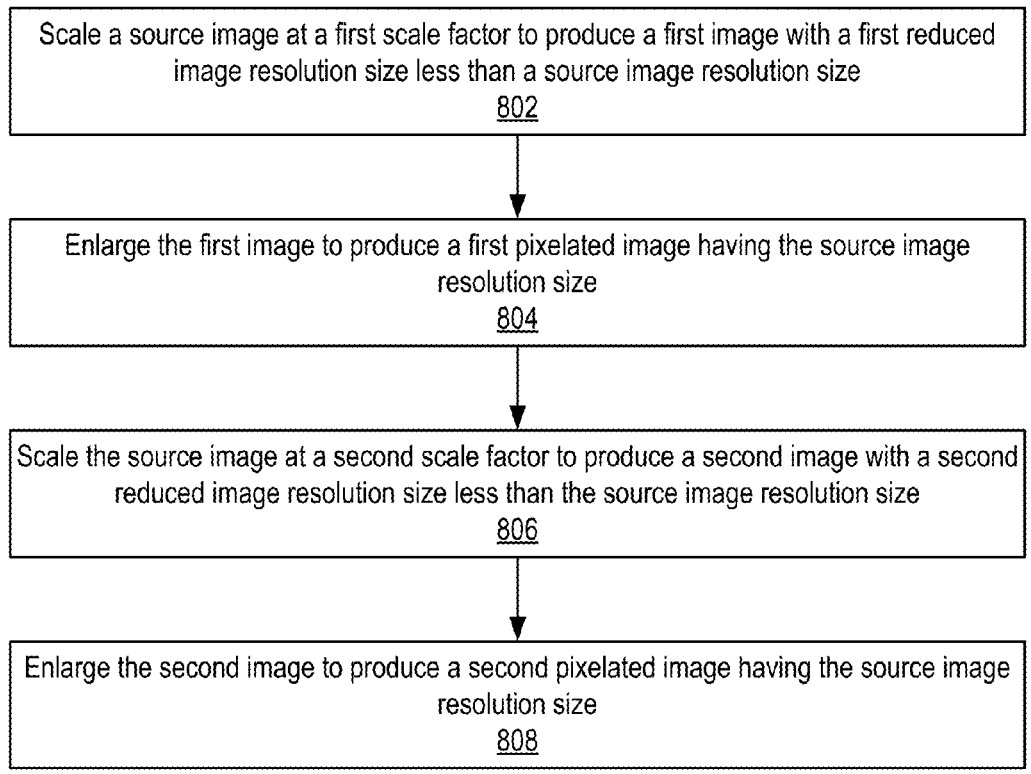
FIG. 8 illustrates an example method associated with providing pixelation and depixelation animations for media content, according to an embodiment of the present disclosure.

FIG. 8 illustrates an example method 800 associated with providing pixelation and depixelation animations for media content, according to an embodiment of the present disclosure. Again, it should be appreciated that there can be additional, fewer, or alternative steps performed in similar or alternative orders, or in parallel, within the scope of the various embodiments unless otherwise stated.

At block 802, the example method 800 can scale a source image at a first scale factor to produce a first image with a first reduced image resolution size less than a source image resolution size. At block 804, the example method 800 can enlarge the first image to produce a first pixelated image having the source image resolution size. The first pixelated image can be included in the set of pixelated images. At block 806, the example method 800 can scale the source image at a second scale factor to produce a second image with a second reduced image resolution size less than the source image resolution size. At block 808, the example method 800 can enlarge the second image to produce a second pixelated image having the source image resolution size. The second pixelated image can be included in the set of pixelated images. The scaling and enlarging can be repeated for any number of times to create a desired pixelation or depixelation animation.

In some embodiments, the at least one of the pixelation animation or the depixelation animation can exclude one or more smoothing effects. This can allow for the pixelation to be more visible, such as by appearing blockier. Otherwise, smoothing effects can cause the pixelation to appear blurry.

In some embodiments, the depixelation animation (or pixelation animation) can occur within an allowable time deviation from when the media content item is completely loaded. For example, a pixelated or obscured version of the media content item can be presented while the media content item is being downloaded (or loaded). At substantially the time when the downloading finishes, the depixelation animation can be provided and then the downloaded (e.g., full resolution, unobscured, non-pixelated, etc.) version of the media content item can be provided, presented, and/or displayed.

Again, it is contemplated that there can be many other uses, applications, and/or variations associated with the various embodiments of the present disclosure. In some instances, various embodiments can be utilized in conjunction with a "pay-to-play" approach to interactively sharing or exchanging content (e.g., also referred to as "Shots," or "Slingshot"). In this approach, for example, a recipient of content, which is included in a received communication, must "pay a cost" or exert some specified effort, such as by providing additional content in a reply to the received communication, in order to fully access the content in the received communication. Furthermore, in some cases, various embodiments of the present disclosure can learn, improve, and/or be refined over time.

Social Networking System—Example Implementation

Figure 9:
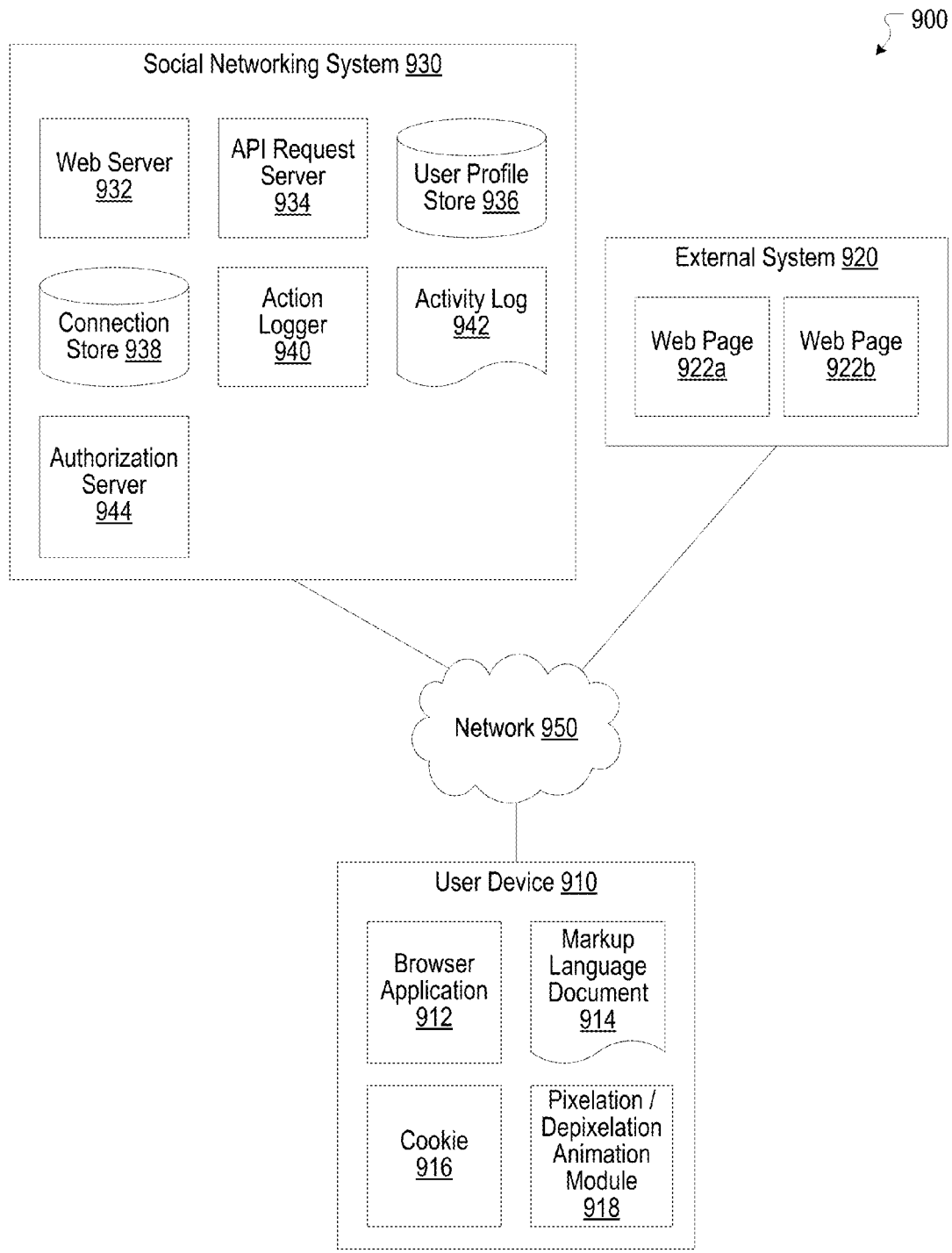
FIG. 9 illustrates a network diagram of an example system that can be utilized in various scenarios, according to an embodiment of the present disclosure.

FIG. 9 illustrates a network diagram of an example system 900 that can be utilized in various scenarios, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922*a* within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the user device 910 can include a pixelation/depixelation animation module 918. The pixelation/depixelation animation module 918 can, for example, be implemented as the pixelation/depixelation animation module 102 of FIG. 1. The pixelation/depixelation animation module 918 can be configured to detect a trigger to initiate at least one of a pixelation animation or a depixelation animation for a media content item. The pixelation/depixelation animation module 918 can also be configured to generate a set of pixelated images based on a source image associated with the media content item. Further, the pixelation/depixelation animation module 918 can be configured to determine variable durations for presenting the set of pixelated images. Moreover, the pixelation/depixelation animation module 918 can be configured to present the set of pixelated images, based on the variable durations, to produce the at least one of the pixelation animation or the depixelation animation. Other features of the pixelation/depixelation animation module 918 are discussed herein in connection with the pixelation/depixelation animation module 102.

Hardware Implementation

Figure 10:
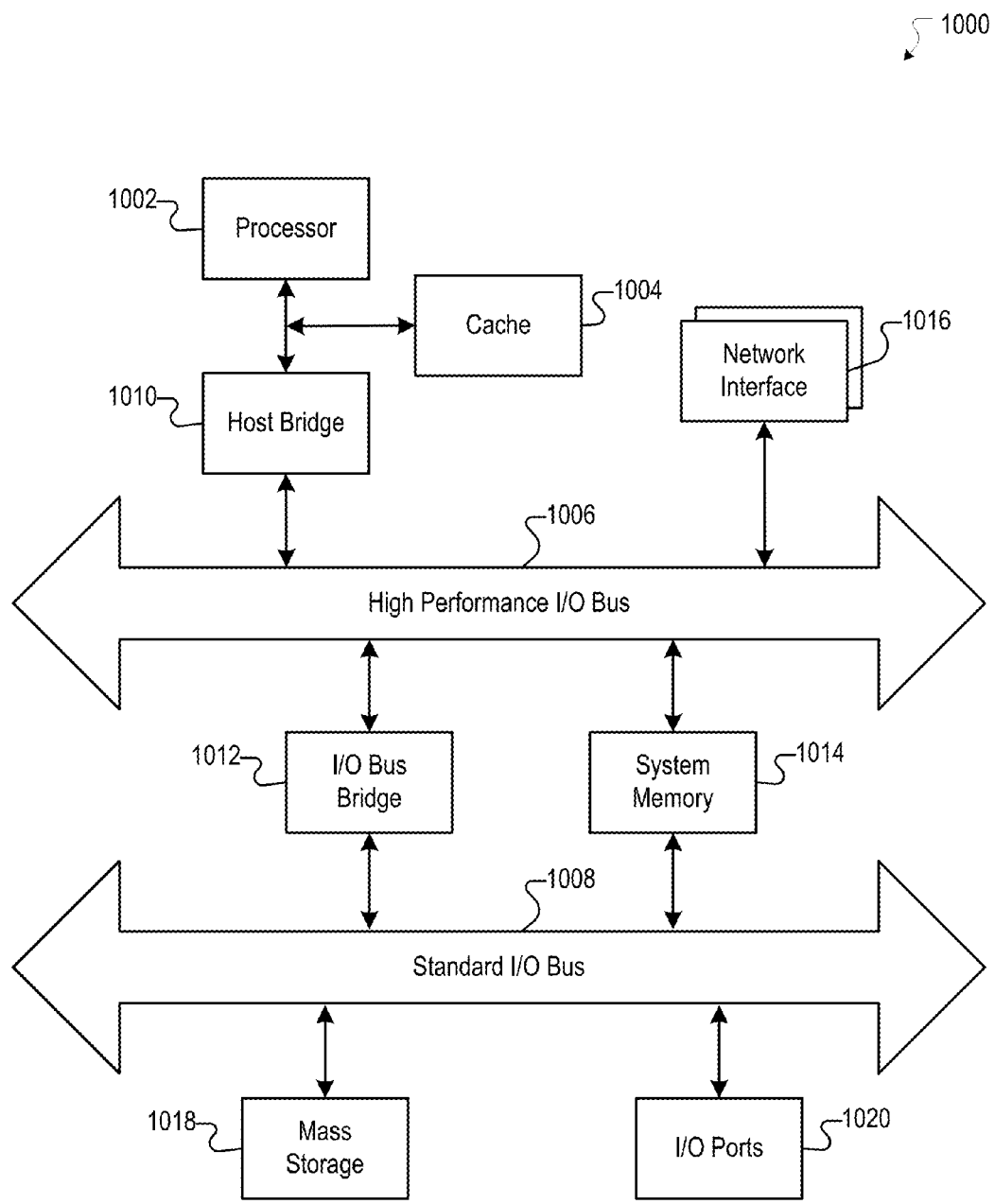
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    detecting, by a computing system, a trigger to initiate at least one of a pixelation animation or a depixelation animation for a media content item;
    generating, by the computing system, a set of pixelated images based on a source image associated with the media content item, wherein each pixelated image in the set of pixelated images has a greater image pixel size than the source image;
    determining, by the computing system, variable durations for presenting the set of pixelated images; and
    presenting, by the computing system, the set of pixelated images in a particular order, based on the variable durations, to produce the at least one of the pixelation animation or the depixelation animation, wherein the set of pixelated images is presented in an order of increasing pixel size of each pixelated image to produce the pixelation animation and the set of pixelated images is presented in an order of decreasing pixel size of each pixelated image to produce the depixelation animation.

2. The computer-implemented method of claim 1, wherein the source image has a source image resolution size, and wherein the generating of the set of pixelated images further comprises:
    scaling the source image at a first scale factor to produce, at least temporarily, a first image with a first reduced image resolution size that is less than the source image resolution size;
    enlarging the first image to produce a first pixelated image having the source image resolution size, the first pixelated image being included in the set of pixelated images;
    scaling the source image at a second scale factor to produce, at least temporarily, a second image with a second reduced image resolution size less than the source image resolution size; and
    enlarging the second image to produce a second pixelated image having the source image resolution size, the second pixelated image being included in the set of pixelated images.

3. The computer-implemented method of claim 2, further comprising:
    determining, based on the trigger, to initiate the pixelation animation, wherein the first reduced image resolution size is greater than the second reduced image resolution, and wherein the presenting of the set of pixelated images includes presenting the first pixelated image prior to presenting the second pixelated image.

4. The computer-implemented method of claim 2, further comprising:
    determining, based on the trigger, to initiate the depixelation animation, wherein the first reduced image resolution size is less than the second reduced image resolution, and wherein the presenting of the set of pixelated images includes presenting the first pixelated image prior to presenting the second pixelated image.

5. The computer-implemented method of claim 2, wherein the scaling of the source image utilizes a nearest neighbor algorithm.

6. The computer-implemented method of claim 1, wherein the trigger is associated with at least one of an instruction to switch between a rear-facing camera view and a front-facing camera view, an instruction to use the media content item in a first communication to be transmitted, or a receipt of a second communication including the media content item.

7. The computer-implemented method of claim 1, wherein the at least one of the pixelation animation or the depixelation animation is performed during a loading of a camera view, and wherein the at least one of the pixelation animation or the depixelation animation is completed within a time frame associated with the loading of the camera view.

8. The computer-implemented method of claim 1, wherein the media content item corresponds to a video, and wherein the source image correspond to a video frame in the video.

9. The computer-implemented method of claim 8, wherein the video frame is selected based on one or more user instructions.

10. The computer-implemented method of claim 8, wherein the video frame corresponds to a first video frame of the video.

11. The computer-implemented method of claim 1, wherein the media content item corresponds to an image, and wherein the source image corresponds to the image.

12. The computer-implemented method of claim 1, further comprising:
performing at least one of progressively shrinking the set of pixelated images when being presented or progressively enlarging the set of pixelated images when being presented.

13. The computer-implemented method of claim 1, wherein the at least one of the pixelation animation or the depixelation animation excludes one or more smoothing effects.

14. The computer-implemented method of claim 1, wherein the determining of the variable durations is based on an accelerated interpolation process.

15. The computer-implemented method of claim 14, wherein the variable durations include at least a first duration and a second duration, wherein the set of pixelated images includes at least a first pixelated image and a second pixelated image, wherein the first pixelated image has a greater image pixel size than the second pixelated image, wherein the accelerated interpolation process causes the first pixelated image to be presented at the first duration and the second pixelated image to be presented at the second duration, and wherein the first duration is longer in time than the second duration.

16. The computer-implemented method of claim 1, wherein the depixelation animation occurs within an allowable time deviation from when the media content item is completely loaded.

17. A system comprising:
at least one processor; and
a memory storing instructions that, when executed by the at least one processor, cause the system to perform:
detecting a trigger to initiate at least one of a pixelation animation or a depixelation animation for a media content item;
generating a set of pixelated images based on a source image associated with the media content item, wherein each pixelated image in the set of pixelated images has a greater image pixel size than the source image;
determining variable durations for presenting the set of pixelated images; and
presenting the set of pixelated images in a particular order, based on the variable durations, to produce the at least one of the pixelation animation or the depixelation animation, wherein the set of pixelated images is presented in an order of increasing pixel size of each pixelated image to produce the pixelation animation and the set of pixelated images is presented in an order of decreasing pixel size of each pixelated image to produce the depixelation animation.

18. The system of claim 17, wherein the source image has a source image resolution size, and wherein the generating of the set of pixelated images further comprises:
scaling the source image at a first scale factor to produce, at least temporarily, a first image with a first reduced image resolution size that is less than the source image resolution size;
enlarging the first image to produce a first pixelated image having the source image resolution size, the first pixelated image being included in the set of pixelated images;
scaling the source image at a second scale factor to produce, at least temporarily, a second image with a second reduced image resolution size less than the source image resolution size; and
enlarging the second image to produce a second pixelated image having the source image resolution size, the second pixelated image being included in the set of pixelated images.

19. A non-transitory computer-readable storage medium including instructions that, when executed by at least one processor of a computing system, cause the computing system to perform:
detecting a trigger to initiate at least one of a pixelation animation or a depixelation animation for a media content item;
generating a set of pixelated images based on a source image associated with the media content item, wherein each pixelated image in the set of pixelated images has a greater image pixel size than the source image;
determining variable durations for presenting the set of pixelated images; and
presenting the set of pixelated images in a particular order, based on the variable durations, to produce the at least one of the pixelation animation or the depixelation animation, wherein the set of pixelated images is presented in an order of increasing pixel size of each pixelated image to produce the pixelation animation and the set of pixelated images is presented in an order of decreasing pixel size of each pixelated image to produce the depixelation animation.

20. The non-transitory computer-readable storage medium of claim 19, wherein the source image has a source image resolution size, and wherein the generating of the set of pixelated images further comprises:
scaling the source image at a first scale factor to produce, at least temporarily, a first image with a first reduced image resolution size that is less than the source image resolution size;
enlarging the first image to produce a first pixelated image having the source image resolution size, the first pixelated image being included in the set of pixelated images;
scaling the source image at a second scale factor to produce, at least temporarily, a second image with a second reduced image resolution size less than the source image resolution size; and
enlarging the second image to produce a second pixelated image having the source image resolution size, the second pixelated image being included in the set of pixelated images.

* * * * *